J. HANSON.
GAFF HOOK.
APPLICATION FILED APR. 11, 1921.
1,404,117.
Patented Jan. 17, 1922.
2 SHEETS—SHEET 1.
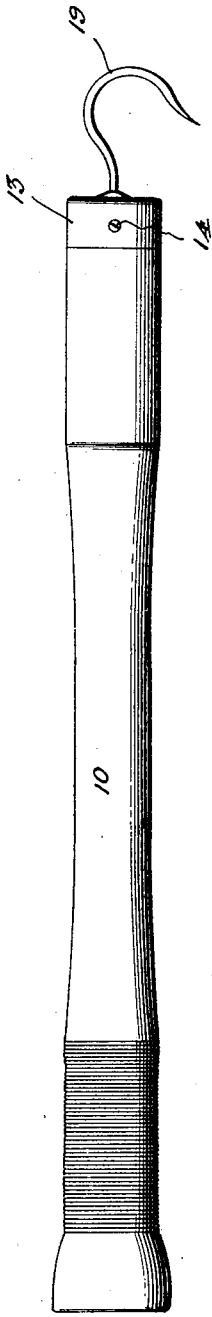
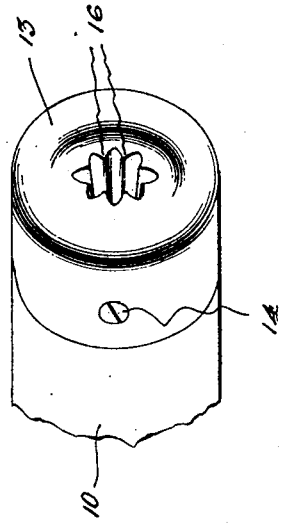
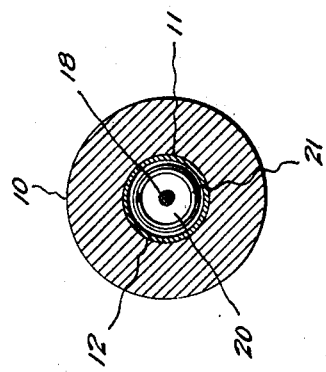
John Hanson, INVENTOR
BY Victor J. Evans
ATTORNEY
WITNESS:

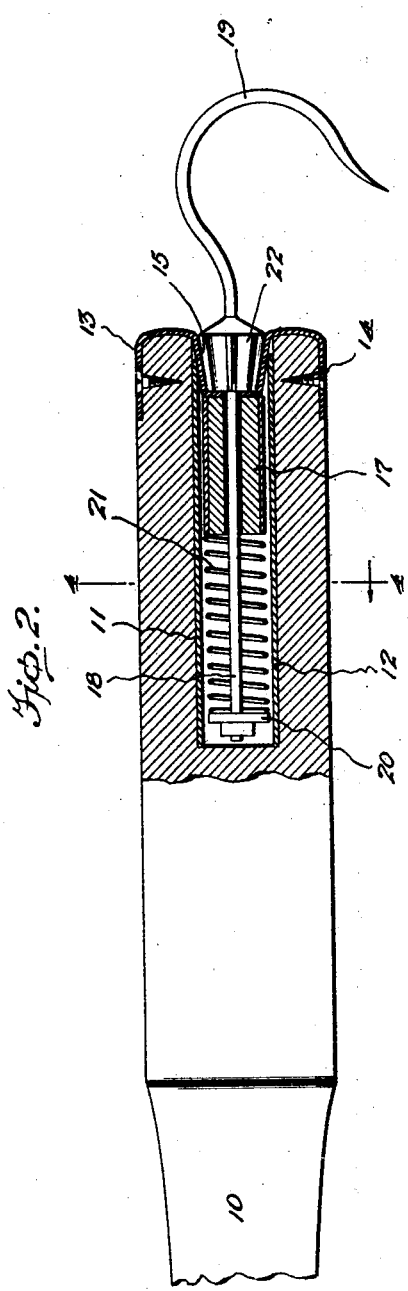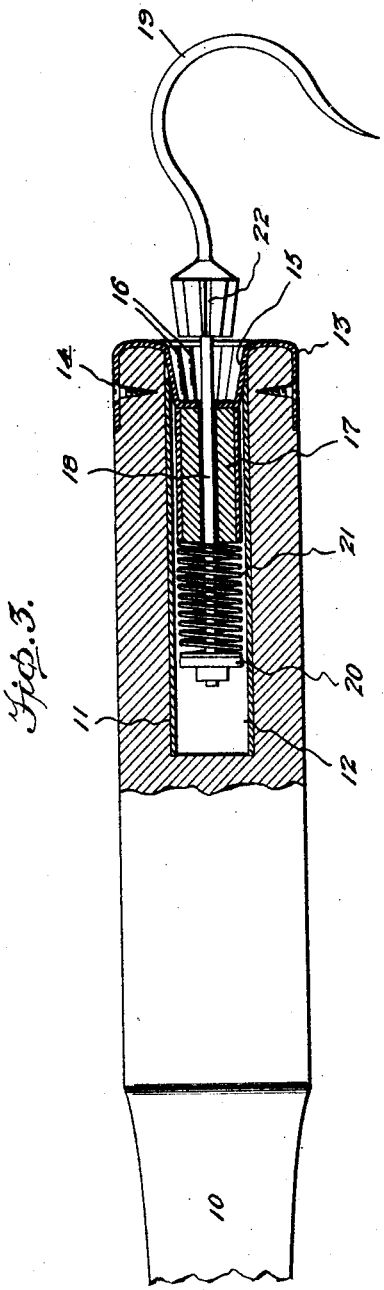

UNITED STATES PATENT OFFICE.

JOHN HANSON, OF DAYHOF, TERRITORY OF ALASKA.

GAFF HOOK.

1,404,117.  Specification of Letters Patent.  Patented Jan. 17, 1922.

Application filed April 11, 1921. Serial No. 460,210.

*To all whom it may concern:*

Be it known that I, JOHN HANSON, a citizen of the United States, residing at Dayhof, Alaska, have invented new and useful Improvements in Gaff Hooks, of which the following is a specification.

This invention relates to gaff hooks, and has for its chief object a construction wherein the hook proper is normally maintained fixed relatively to the handle of the device, but susceptible of being moved to a position with respect to the handle, where it is permitted rotary motion, with a view of keeping the fish on the hook, as the hook can turn and twist with the movements of the fish in an effort to separate itself from the hook.

The nature and advantages of the invention will be better understood when the following detailed description is read in connection with the accompanying drawings, the invention residing in the combination, construction, and arrangement of parts as claimed.

In the drawings forming part of this application, like numerals of reference indicate similar parts in the several views and wherein:

Figure 1 is a view in elevation of the device forming the subject matter of my invention.

Figure 2 is a fragmentary sectional view showing the normal position of the hook with respect to the handle.

Figure 3 is a similar view showing the position of the hook separated from the handle to permit of rotation.

Figure 4 is a transverse sectional view taken on line 4—4 of Figure 2.

Figure 5 is a fragmentary perspective view of the cap associated with one end of the handle.

The device forming the subject matter of my invention comprises a handle 10 which may be constructed from any suitable material and may also vary in size without departing from the spirit of the invention. The handle is provided with a bore 11 which opens at one end of the handle as illustrated. This bore receives a metallic sleeve 12 which terminates short of the open end of the bore 11. Surrounding the lower end of the handle 10 is a cap 13 which is secured to the handle by means of suitable fastening elements 14, the cap being formed to provide a centrally disposed tubular portion 15 which is received by the bore 11 of the handle. This tubular portion is tapered toward one end, and supports the sleeve-like member 12 above referred to. The tubular portion is further formed with teeth 16 which are correspondingly tapered with the taper of the tubular member. Arranged within the sleeve 12 is a core 17 which is also supported by the adjacent end of the tubular portion 15 of the cap 13.

Slidable through the core 17 is the shank 18 of the gaff hook 19, this shank supporting a washer 20 against which one end of a spring 21 bears, the opposite end of the spring bearing against the adjacent end of the core 17. The shank 18 supports a toothed conical shaped member 22 which is adapted to be received within the tubular portion 15 of the cap, the teeth of this member 22 meshing with the teeth 16 of the cap. The spring 21 functions to normally maintain the member 22 positioned within the tubular portion 15 of the cap, and when the teeth of these respective members are in mesh, the hook 19 is held fixed relatively to the handle 10, that is against any possible rotation with respect thereto.

In practice, the gaff hook is normally arranged in the position illustrated in Figures 1 and 2 and the device used in the usual well known manner. When a fish is gaffed, the hook 19 moves away from the handle 10 under the weight of the fish and against the tension of the spring 21, and when the toothed member 22 is wholly separated from the handle, as illustrated in Figure 3, the hook is susceptible of rotating with respect to the handle, thereby moving with the movements of the fish in an effort to separate itself from the hook. By reason of this fact it is obvious that it is not an easy matter for a fish to separate itself from the gaff hook, or in any way break the hook by twisting or turning over in the water, as is sometimes frequently the case, resulting in the loss of the gaff hook as well as the fish. After the fish has been removed from the hook the spring 21 functions to normally return the hook 19 to the position illustrated in Figures 1 and 2. By reason of the fact that the member 22 is substantially of conical formation, and that the portion 15 of the cap is tapered, the teeth of these respective parts can readily and easily mesh with each other, when the hook is adjusted under the influence of the spring 21.

While it is believed that from the foregoing description the nature and advantages of the invention will be readily apparent, I desire to have it understood that I do not limit myself to what is herein shown and described, and that such changes may be resorted to when desired, as fall within the scope of what is claimed.

What I claim is:

1. A device of the class described comprising a handle, a hook including a shank slidably and rotatably fitted in said handle, and means normally holding said hook against rotation.

2. A device of the class described comprising a handle, a hook including a shank slidably and rotatably fitted in said handle, and co-operating means carried by the shank and handle to prevent rotation of the hook in its normal position.

3. A device of the class described comprising a handle, a hook including a shank slidably and rotatably fitted in said handle, resilient means yieldably supporting the hook, and means for preventing rotation of the hook when the latter is held in its normal position under the influence of said resilient means.

4. A device of the class described comprising a handle having a bore opening at one end, a cap fitted on one end of the handle and having a tubular portion projecting in said bore, teeth formed on said tubular portion, a hook including a shank slidably and rotatably fitted in said handle, a toothed member carried by the shank and adapted to engage the teeth of the tubular member to normally prevent rotation of the shank, and means for normally holding the toothed member within the tubular member.

5. A device of the class described comprising a handle having a bore opening at one end, a cap fitted on one end of the handle and having a toothed tubular portion fitted in said bore, a hook including a shank slidably and rotatably fitted in said handle, a toothed member carried by the shank, resilient means arranged within the bore of the handle and surrounding said shank to normally hold the toothed member positioned within the tubular portion of the cap, the teeth of said member engaging the teeth of the tubular portion of said cap to normally prevent rotation of the hook.

In testimony whereof I affix my signature.

JOHN HANSON.